US 6,595,636 B2
Jul. 22, 2003

(12) United States Patent
Zolten (10) Patent No.: US 6,595,636 B2
(45) Date of Patent: Jul. 22, 2003

(54) OCCLUDED CONTACT LENS WITH PERIPHERAL VISION FUNCTIONALITY

(75) Inventor: Avram J. Zolten, Little Rock, AK (US)

(73) Assignee: Comprehensive Neuropsychological Services, LLC, Little Rock, AR (US)

( * ) Notice: Subject to any disclaimer, the term of this patent is extended or adjusted under 35 U.S.C. 154(b) by 0 days.

(21) Appl. No.: 10/046,023

(22) Filed: Oct. 29, 2001

(65) Prior Publication Data

US 2003/0081170 A1 May 1, 2003

(51) Int. Cl.$^7$ ................................................ G02C 7/04
(52) U.S. Cl. .............................. 351/160 R; 351/160 H; 351/203; 351/163
(58) Field of Search ........................ 351/160 R, 160 H, 351/161, 162, 163, 203

(56) References Cited

U.S. PATENT DOCUMENTS

| 1,802,424 A | 4/1931 | Hitchiner .................... 351/165 |
| 2,139,213 A | 12/1938 | Verre ......................... 351/165 |
| 4,324,461 A | 4/1982 | Salvatori ................ 351/160 H |
| 4,744,647 A | 5/1988 | Meshel et al. .............. 351/177 |
| 4,830,482 A | 5/1989 | Resnikoff ................... 351/172 |
| 5,008,102 A | 4/1991 | York .......................... 424/59 |
| 5,139,323 A | 8/1992 | Schillo ........................ 351/45 |
| 5,182,588 A | 1/1993 | Maurer et al. .............. 351/165 |
| 5,305,027 A | 4/1994 | Patterson ..................... 351/44 |
| 5,424,786 A | 6/1995 | McCarthy .................... 351/46 |
| 5,434,630 A | 7/1995 | Bransome .................. 351/162 |
| 5,440,359 A | 8/1995 | Bloch-Malem ............ 351/203 |
| 5,483,304 A | 1/1996 | Porat .......................... 351/161 |
| 5,489,953 A | 2/1996 | Griffith ........................ 351/95 |
| 5,502,518 A | 3/1996 | Lieberman .............. 351/160 R |
| 5,570,142 A | 10/1996 | Lieberman .............. 351/160 R |
| 5,570,144 A | 10/1996 | Lofgren-Nisser ........... 351/247 |
| 5,662,706 A | 9/1997 | Legerton et al. ........... 623/5.13 |
| 5,757,458 A * | 5/1998 | Miller et al. ................. 351/162 |
| 5,886,769 A | 3/1999 | Zolten ........................ 351/219 |
| 6,062,687 A | 5/2000 | Lofgren-Nisser ............ 351/46 |
| 2003/0002011 A1 * | 1/2003 | Streibig ....................... 351/162 |

FOREIGN PATENT DOCUMENTS

WO          WO 99/59461           11/1999

OTHER PUBLICATIONS

U.S. patent application Ser. No. 09/706,920, Zolten, filed Not Published.

Fouty, H., et al., "A Novel Contact–Lens System to Assess Visual Hemispheric Asymmetries," *Perceptual and Motor Skills*, 1992, pp. 567–575.

Harrell, E., et al., "Performance of Subjects with Left Visual Neglect after Removal of the Right Visual Field Using Hemifield Goggles," *Journal of Rehabilitation*, Oct./Nov./Dec. 1995, pp. 46–49.

* cited by examiner

*Primary Examiner*—Jordan M. Schwartz
*Assistant Examiner*—Jessica Stultz
(74) *Attorney, Agent, or Firm*—Ray F. Cox, Jr.

(57) ABSTRACT

A contact lens for rehabilitation or training of targeted portions of the brain in which the contact lens has occluded regions to selectively blind portions of the central visual field corresponding to non-targeted areas of the brain to force visual processing to a particular portion of the brain which is thereby stimulated. The region of the contact lens over portion of the pupil of the eye corresponding to the central visual field of the targeted area of the brain is substantially transparent. In order to preserve sufficient visual cues for the patient to maintain balance and orientation, at least a portion of the contact lens over the portion of the pupil of the eye corresponding to the peripheral visual field of the non-targeted area of the brain is also transparent.

7 Claims, 5 Drawing Sheets

OCCLUDED CONTACT LENS WITH PERIPHERAL VISION FUNCTIONALITY

CROSS-REFERENCE TO RELATED APPLICATIONS

The present application is related to co-pending U.S. application Ser. No. 09/706,920, filed Nov. 6, 2000, entitled "Method of Training and Rehabilitating Brain Function Using Hemi-Lenses", which is a continuation of International Application No. PCT/US98/27508 (published as WO 99/59461 on Nov. 25, 1999), which claimed the priority of U.S. application Ser. No. 09/080,748 filed May 18, 1999 (now issued as U.S. Pat. No. 5,886,769), all by the same inventor. These applications are incorporated herein by reference.

STATEMENT REGARDING FEDERALLY SPONSORED RESEARCH OR DEVELOPMENT

Not Applicable.

BACKGROUND OF THE INVENTION

1. Field of the Invention

The present invention relates to training and rehabilitating brain function, and in particular, to the use of occluded contact lenses with peripheral vision functionality to accomplish this purpose.

Brain injury, such as Cerebral Vascular Accident (stroke), closed head injury, penetrating head wounds, and invasive growths can generate a variety of sensory/perceptual and other cognitive disturbances that significantly impact the ability of individuals to maintain independence in their environments. When this insult occurs in the posterior regions of the brain, especially the parietal and/or occipital lobes, a change in the functioning of the visual perceptual system can occur. These sensory/perceptual disturbances involve inattention to visual stimuli to a varying degree, from mild inattention to details to complete loss of recognition of visual information in a given visual field. In some instances, perception of the visual field disappears completely.

There are few options for rehabilitation of the patient with a visual perceptual defect. Most techniques involve behavioral and/or cognitive training directed at focused extra attention to the visual field that has been disrupted. The results of this type of rehabilitation have been successful, but limited.

Recent evidence showing that attention plays an essential role in almost all other brain functions including motor functioning in stroke patients with hemiparesis or hemiplegia suggests that any technique that can improve attention related to brain injury might help in the recovery of many non-vision related brain functions. In addition, some research has established a relationship between hemispheric attention and visual processing in the dysfunction of developmental reading disorder, the most common type of learning disability.

Furthermore such improvement in brain function could also be effective in visual training in non-medical settings. For example, baseball batters use asymmetric visual information when standing at the plate judging pitches. Isolating the field that captures the pitcher and pitch, and blocks the catcher, umpire, and other distractions might significantly improve batting performance.

2. Brief Description of the Related Art

Contact lens, glasses and the like are known in which regions of the lens are rendered opaque or semi-opaque for the purpose of correcting defects in vision or to shield the eye from damage. A lens in which regions of the lens are opaque or semi-opaque are referred to herein as an occluded lens.

Harrell, E. H., T. Kramer-Stutts, and A. J. Zolten, "Performance of Subjects with Left Visual Neglect after Removal of the Right Visual Field Using Hemifield Goggles," *Journal of Rehabilitation,* (October/November/December 1995), pp. 46–49, discloses improved performance with visual input directed to a neglected field when the non-neglected field is occluded. Harrell et al. disclose complete occlusion of the visual field directed to one hemisphere of the brain. Harrell et al. disclose changing the amount of visual field input by adjusting Velcro strips on goggles to provide occlusion.

While Harrell et al. suggest that in the future a procedure using contact lenses might be preferable to goggles, they conclude that this would be expensive and probably not feasible for practical applications in rehabilitation. However, various techniques are known for manufacturing contact lenses with opaque or tinted areas.

One of the problems in using contact lens having occluded regions is that the contact lens must sit on the eye without rotation. Various techniques are known for maintaining the position of a contact lens without rotation. For example, such techniques are disclosed in U.S. Pat. Nos. 4,324,461; 5,483,304; 5,502,518; and 5,570,142.

Lofgren-Nisser in U.S. Pat. Nos. 6,062,687 and 5,570,144 discloses a contact lens with a vertical orienting mass and an occluded portion that restricts light passing through the occluded portion.

BRIEF SUMMARY OF THE INVENTION

The present invention is an occluded contact lens which selectively blocks visual sensory input to a specific portion of the brain.

The "blinding" of the sensory-blocked portion of the brain forces processing of all primary visual information to the remaining portions of the brain. This technique is useful in the rehabilitation of visual field defects, training of brain function and for other purposes.

For example, if the left halves of each of a pair of contact lenses are rendered opaque (e.g., by patching the left half of each lens with black non-translucent contact lens plastic), visual processing is forced to the left hemisphere of the brain thereby stimulating that area of the brain. Occluding the right halves of each of a pair of contact lenses with opaque material would stimulate the opposite hemisphere.

Specific areas of the brain are targeted by selectively blinding portions of each of a pair of contact lenses over more or less than a full hemisphere. For example, a particular quarter segment of each lens could be rendered clear or the remaining ¾ segment could be rendered opaque. Various combinations of blocked portions of the contact lenses may therefore be utilized to force visual processing to a particular portion of the brain that is thereby stimulated. Each contact lens is weighted or otherwise constructed so that the lenses sit on the eye without rotating.

A method of using the occluded contact lens to rehabilitate a patient with a visual defect or training specific visual processing areas consists of having the patient perform visual and non-visual tasks constructed to activate processing in the targeted portion of the brain. A graduated series of occluded contacts lenses constructed of semi-transparent material of varying degrees of opacity may allow the patient's visual system to adapt in stages to the rehabilitated balance between intact visual processing and relearned visual processing.

One difficulty in having the patient perform tasks with a portion of the visual field occluded, particularly tasks that involve motion of the patient, is that occlusion of a significant portion of the visual field of one or both hemispheres may leave the patient without the means for orientation and balance, since a significant proportion of the sensory input from which the brain derives orientation cues is visual. It is therefore desirable to leave portions of the visual field un-occluded for visual orientation cues. However, this works against the desirability of completing excluding visual information from the non-targeted areas of the brain. The solution of the present invention is based on the principle that the visual field is not uniform in regard to the quantity of visual information received and processed. The central visual field, i.e., the portion of the visual field within a relatively narrow cone with an axis aligned with the line along which the eye is fixed ("the central visual axis"), processes a much greater amount of information than the portions of the visual field farther from the central visual axis. The latter portions of the visual field, the peripheral visual field, therefore do not contribute a significant amount of visual information to the brain. The peripheral visual field, however, does significantly factor into the establishment of balance and orientation cues.

The present invention therefore uses these principals to maintain a significant degree of occlusion of visual information being received by non-targeted areas of the brain while allowing information from the peripheral visual field to be received by the non-targeted areas of the brain in order to preserve sufficient visual cues for orientation and balance. This is accomplished by dividing each contact lens into three regions: a first region is substantially clear over the portion of the pupil of the eye directing visual information to the targeted area of the brain, a second region is occluded over substantially all of the portion of the pupil of the eye directing visual information to the non-targeted area of the brain, and the third region is substantially clear over at least a portion of the peripheral visual field corresponding to the non-targeted area of the brain to allow for visual cues sufficient for balance and orientation of the patient.

It is therefore an object of the present invention to provide for a contact lens product having occluded regions to force visual processing to targeted areas of the brain to encourage rehabilitation and training of such targeted areas while maintaining sufficient visual cues from the peripheral visual field to allow the patient to maintain balance and orientation.

DETAILED DESCRIPTION OF THE INVENTION

The present invention uses an occluded contact lens product to selectively block visual sensory input to a specific targeted portion of the brain. This "blinding" of the sensory blocked portion of the brain forces processing of all primary visual information to the remaining unblocked portion. This forced processing paradigm can be used in the rehabilitation of visual field defects including visual hemi-neglect and/or hemi-inattention, as well as homonymous hemianopsia. Occluded contact lenses can also be used in the rehabilitation of other attention problems related to brain injury including spatial attention, motor control, memory problems, language disturbances and other brain-injury problems associated with asymmetric brain insult.

Figure 1:
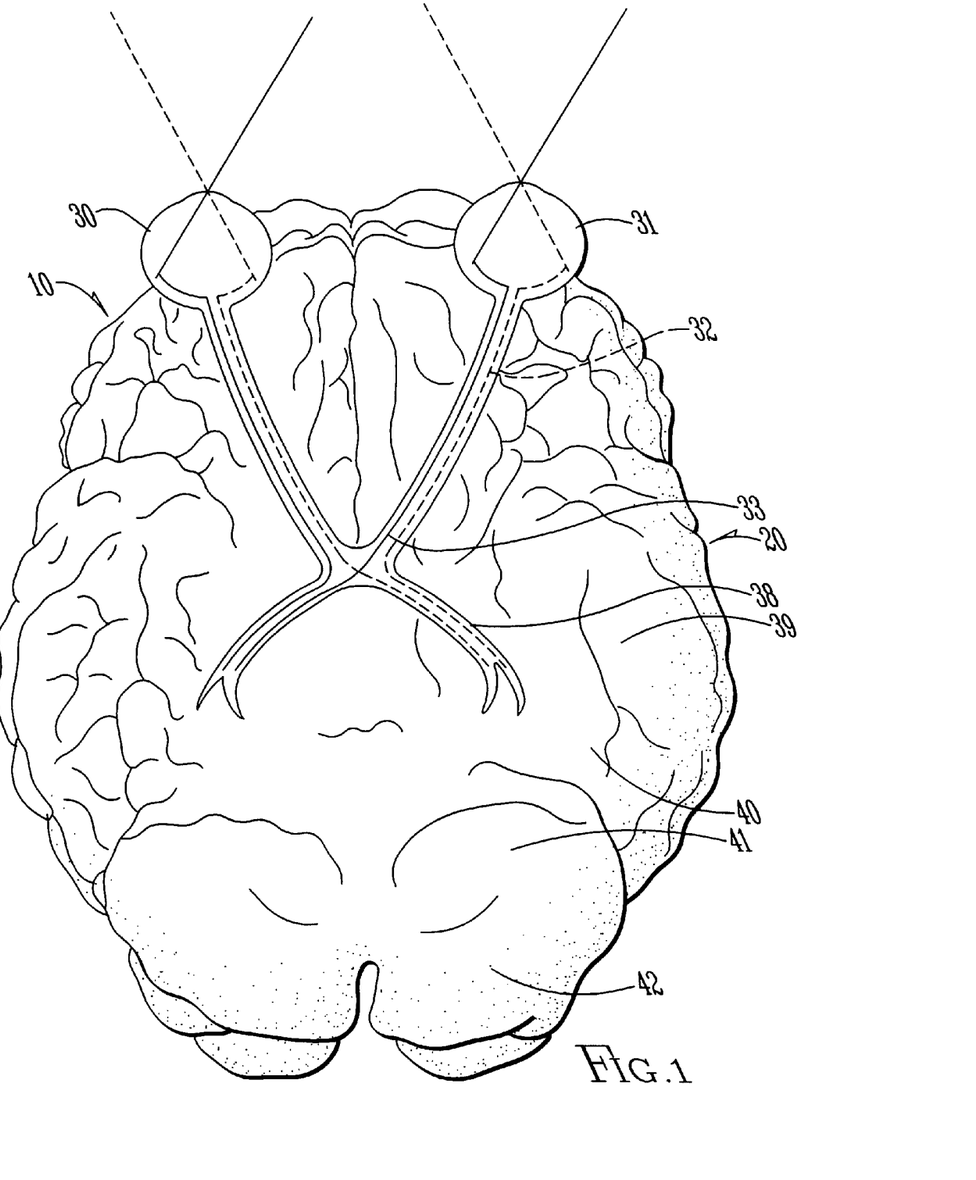
FIG. 1 is a horizontal (coronal) cross section of a human brain through the central visual axis of the eyes illustrating various portions of the brain involved in visual processing.
Figure 2:
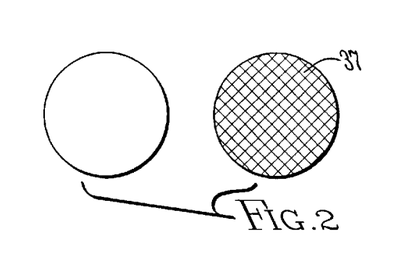
FIG. 2 is a schematic diagram of the effect on the left and right visual field as a result of injury to an optic nerve.

The action of the present invention may be described with reference to FIG. 1. Visual perception is redundantly provided to both hemispheres 10, 20 of the brain independently by each eye 30, 31. This allows for binocular vision and depth perception. The lateral visual field of each eye projects visual information to the contralateral visual cortex and the medial visual field of each eye projects visual information across to the ipsilateral visual cortex.

The focused retraining of the injured portion of the brain is accomplished with the delivery of a vision blocking system that effectively removes incoming visual information to the intact hemisphere of the brain.

Occluded lenses 50 are designed to eliminate visual information by "patching" a portion of each lens with black, non-translucent contact lens plastic. In one embodiment, the occluded region is a radial segment of the lens. The term "radial segment" is intended herein to refer to a segment of a lens defined by lines radiating outward from the center of the lens. Each contact lens is weighted or otherwise constructed to ensure that the lens sits without rotating on the eye so that the occluded region remains oriented in the correct position to occluded the selected portion of the visual field of the eye of the patient. Means of accomplishing non-rotation of a contact lens are known in the art.

Figure 3A:
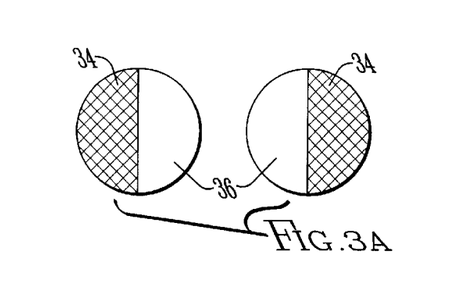
FIG. 3A is a schematic diagram of the effect on the left and right visual field as a result of injury to the optic chiasm.
Figure 3B:
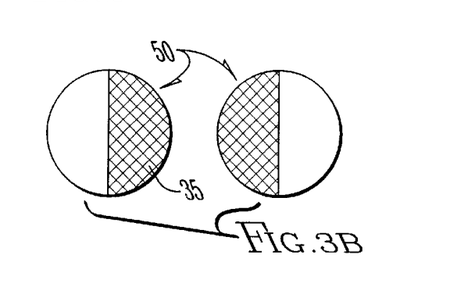
FIG. 3B is a front elevation view of a pair of contact lens with occluded regions for forcing visual processing to the injured area schematically illustrated in FIG. 3A.

Focused retraining or rehabilitation may be described with reference to FIGS. 1–8A. Injury to an optic nerve 32 produces an effect on the visual field 37 of the injured optical nerve as illustrated schematically in FIG. 2. Complete loss of the visual field of either the left or right eye is not amenable to treatment by the present invention. However, injury to the optic chiasm 33, which results in loss to the lateral visual field 34 as shown in FIG. 3A, may be treated by the use of occluded lenses having occluded radial segments 35 over the medial visual fields as shown in FIG. 3B, thereby forcing visual processing to the lateral visual fields 36.

Figure 4A:
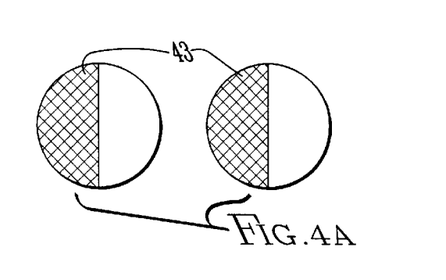
FIG. 4A is a schematic diagram of the effect on the left and right visual field as a result of injury to the optic tract.
Figure 4B:
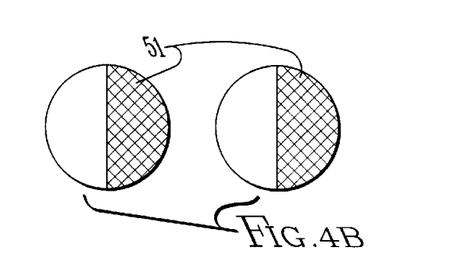
FIG. 4B is a front elevation view of a pair of contact lens with occluded regions for forcing visual processing to the injured area schematically illustrated in FIG. 3A.
Figure 5A:
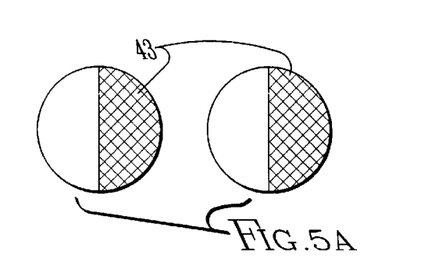
FIG. 5A is a schematic diagram of the effect on the left and right visual field as a result of injury to the anterior parietal lobe.
Figure 5B:
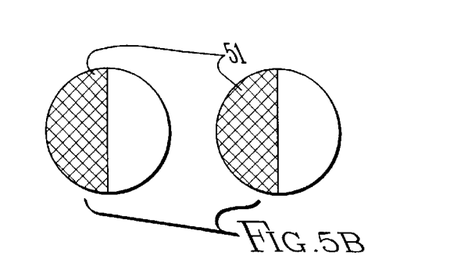
FIG. 5B is a front elevation view of a pair of contact lens with occluded regions for forcing visual processing to the injured area schematically illustrated in FIG. 3A.

Injury to the optic tract 38 as shown in FIG. 4A or injury to the anterior parietal lobe 39 as shown in FIG. 5A, results in the loss of either the left or right visual field 43 depending on which hemisphere-specific optic tract is injured. The effect of this type of injury on the visual fields is illustrated in FIGS. 4A and 5A. Such injuries may be rehabilitated by the present invention using occluded lenses 50 having either left or right occluded radial segments 51 to force visual processing to the injured visual field 43 as shown in FIGS. 4B and 5B.

Figure 6A:
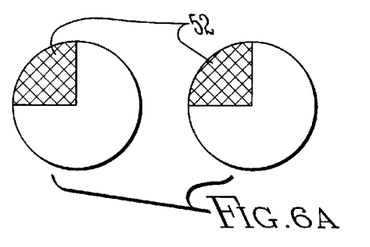
FIG. 6A is a schematic diagram of the effect on the left and right visual field as a result of injury to a portion of the posterior parietal lobe.
Figure 6B:
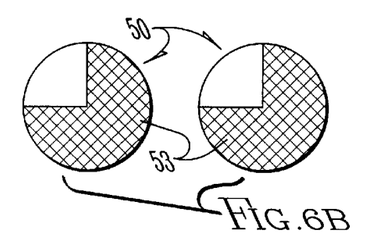
FIG. 6B is a front elevation view of a pair of contact lens with occluded regions for forcing visual processing to the injured area schematically illustrated in FIG. 3A.
Figure 7A:
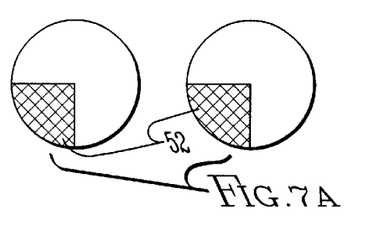
FIG. 7A is a schematic diagram of the effect on the left and right visual field as a result of injury to a portion of the posterior parietal lobe posterior to the injury site of FIGS. 6A and 6B.
Figure 7B:
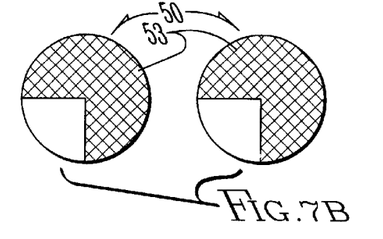
FIG. 7B is a front elevation view of a pair of contact lens with occluded regions for forcing visual processing to the injured area schematically illustrated in FIG. 3A.

Injury to portions of the posterior parietal lobe 40, 41 may produce the loss of radial segments of the visual field 52 of less than a full hemisphere as illustrated in FIGS. 6A and 7A. Corresponding occluded contact lenses 50 occluding radial segments 53 as illustrated in FIGS. 6B and 7B respectively, force visual processing to the damaged visual fields 52.

Figure 8A:
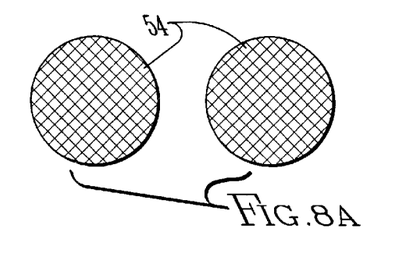
FIG. 8A is a schematic diagram of the effect on the left and right visual field as a result of injury to the occipital lobe.
Figure 9:
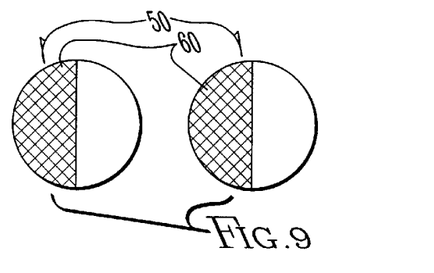
FIGS. 9, 10, 11, and 12 are front elevation views of pairs of contact lens with occluded regions having varying degrees of opacity ranging from most opaque (FIG. 9) to least opaque (FIG. 12).
Figure 10:
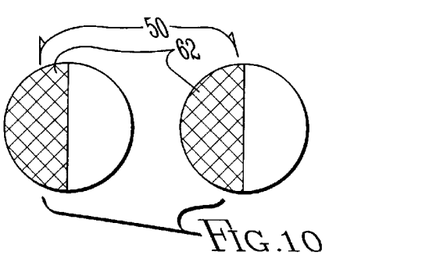
Figure 11:
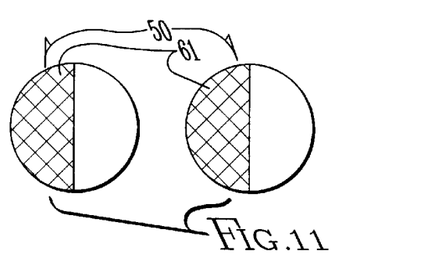
Figure 12:
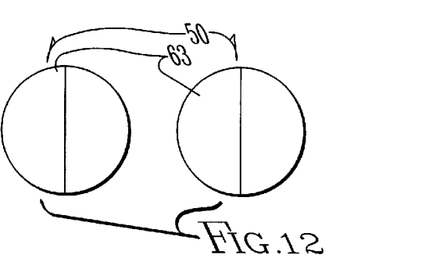

Injury to the occipital lobe 42 producing the complete loss of the visual field 54 of both eyes as illustrated in FIG. 8A is not amenable to treatment by the present invention.

Rehabilitation of the patient with occluded contact lenses consists of visual and non-visual tasks constructed to activate processing in the injured portion of the brain. Visual sensory stimulation obviously occurs, but multi-modal sensory stimulation, processing of hemisphere specific tasks, and hemisphere specific motor tasks is also involved in an effort to stimulate the injured areas of the brain with as little interference from the intact brain via sensory blocking.

Alternatively to completely opaque radial segments 60 of each lens, the degree of opacity may vary, from approximately 90% input blockage radial segments 61 to approximately 10% blockage radial segments 62 as illustrated schematically by FIGS. 9–12 in stages of gradually decreasing opacity. By allowing some hemisphere-specific visual information to reach the intact visual cortex, contralateral visual sensory matching can occur, with the intact visual field providing some sensory/perceptual architecture to the damaged visual sensory field. Hence, use of semi-opaque occluded lenses would allow both an increased sensory emphasis on processing visual information with the damaged visual sensory apparatus and allow for that damaged sensory apparatus to derive internal feedback from the intact visual sensory apparatus, located in the spared visual field.

Occluded contact lenses constructed of a graduated series of such semi-transparent materials would gradually allow the patient's visual system to adapt to the rehabilitated balance between intact visual processing and relearned visual processing. It is possible that some individuals will demonstrate improved attention and safety with some level of visual blocking at all times requiring long-term use of these semi-opaque contact lenses while other may retrain to completely clear lens segments 63.

As noted above, allowing some hemisphere-specific visual information to reach the intact visual cortex may provide some desirable sensory input to the non-targeted area of the brain. One difficulty in having the patient perform tasks with a portion of the visual field occluded, particularly tasks that involve motion of the patient, is that occlusion of a significant portion of the visual field of one or both hemispheres may leave the patient without the means for orientation and balance, since a significant proportion of the sensory input from which the brain derives orientation cues is visual. It is therefore desirable to leave portions of the visual field un-occluded for visual orientation cues. However, this works against the desirability of completing excluding visual information from the non-targeted areas of the brain. The solution of the present invention is based on the principle that the visual field is not uniform in regard to the quantity of visual information received and processed. The central visual field, i.e., the portion of the visual field within a relatively narrow cone centered around the point on which the eye is fixed, processes a much greater amount of information than the portions of the visual field farther from the point at which the eye is fixed. The latter portions of the visual field, the peripheral visual field, therefore contribute a less significant amount of visual information to the brain. The peripheral visual field, however, does significantly factor into the establishment of balance and orientation cues.

The present invention therefore uses these principals to maintain a significant degree of occlusion of visual information being received by non-targeted areas of the brain while allowing information from the peripheral visual field to be received by the non-targeted areas of the brain in order to preserve sufficient visual cues for orientation and balance.

Figure 13:
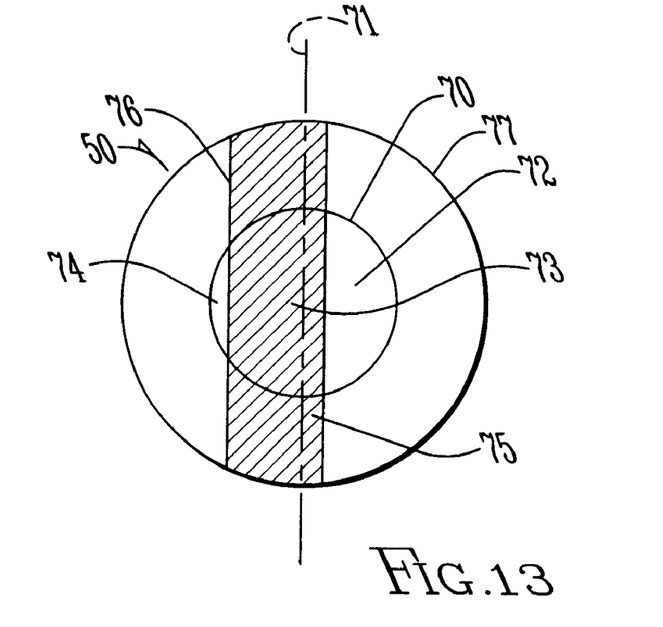
FIG. 13 is a front elevation view of an embodiment of the occluded contact lens of the present invention in which the occluded region is a vertical strip extending to the margins of the contact lens and substantially reducing the visual sensory input over a portion of the pupil of the eye but not occluding all of the lateral peripheral visual field associated with the non-targeted area of the brain.

This is accomplished as shown in FIG. 13 by dividing each contact lens 50 into three regions as described following. The contact lens 50 is placed on the eye of a person and is maintained in a substantially vertically oriented position by various means which are known in the art. The contact lens 50 rests over the pupil 70 of the person's eye. The midline 71 through the pupil 70 divides the visual field into left and right portions which are perceived by opposite hemispheres of the brain of the person. One hemisphere is targeted for rehabilitation and training and the other hemisphere is not targeted, or as sometimes used herein, non-targeted. In other words, the intent of the present invention is to substantially reduce the visual sensory input to the non-targeted hemisphere of the brain and to allow the targeted hemisphere of the brain to receive substantially unimpaired visual sensory input.

The contact lens 50 comprises a first region 72 which is substantially transparent over a portion of the pupil 70 corresponding to the central visual field of the targeted hemisphere of the brain, a second region 73 is occluded over a portion of the pupil 70 corresponding to the central visual field of the non-targeted hemisphere of the brain, and a third region 74 is substantially transparent over at least a portion of the lateral portion of the pupil 70 corresponding to the peripheral visual field of the non-targeted hemisphere to allow for visual cues sufficient for balance and orientation of the patient.

In the preferred embodiment, the second region 73 is defined by a first line 75 which is substantially vertical and which extends to the periphery 77 of the contact lens 50, and by a second line 76 which is also substantially vertical and which extends to the periphery 77 of the contact lens 50. The second region 73 therefore would comprise a substantially vertical occluded strip across the contact lens 50.

The first line 75 may be located substantially over the midline 71 of the pupil 70 or may be located to the side of the midline 71 toward the visual field of the targeted hemisphere. Since the non-targeted hemisphere may receive some visual sensory input from the visual field beyond the midline 71, such an orientation of the first line 75 may reduce visual sensory input to the non-targeted hemisphere.

The second line 76 is located so that a portion of the lateral pupil corresponding to the peripheral visual field of the non-targeted hemisphere is not occluded. This allows some visual information to be received by the non-targeted hemisphere. Since the visual information is received from the peripheral visual field, the sensory input does not substantially affect the desired action of forcing visual processing to the targeted hemisphere, but does allow some visual information sufficient for orientation and balance to be received by the non-targeted hemisphere.

Recent evidence that attention plays an essential role to almost all other brain functions including motor functioning in stroke patients with hemiparesis or hemiplegia, suggest that any technique that can improve attention related to brain injury, might help in the recovery of many non-vision related brain functions. In addition, some research has established a relationship between hemispheric attention and visual processing in the dysfunction of developmental reading disorder, the most common type of learning disability. With reading and language processing skewed towards left hemisphere functioning, and spatial, arithmetic and social/emotional sensibilities skewed towards right hemisphere processing, the use of occluded lenses to effectively block and isolate specific areas of brain functioning might be effective in generating useful information and greater understanding of the brain's functioning.

Examples include:

Treatment of stroke-related motor programming problems. Recent evidence that attention plays an role essential to almost all other brain functions including motor functioning in stroke patients with hemiparesis or hemiplegia, suggest that any technique that can improve attention related to brain injury, might help in the recovery of many non-vision related brain functions. Occluded lenses used as an adjunctive device in tandem with the tradition rehabilitation therapies including physical and occupational therapy have the potential to accelerate the restoration of muscle tone and control, balance, and coordination, in addition to the possibility that recovery of hemispheric specific attention could reduce or relieve hemiplegia, hemiparesis, and/or contactures associated with nonuse.

Treatment of Developmental Reading Disorder. Some research has established a relationship between hemispheric attention and visual processing in the dysfunction of developmental reading disorder, the most common type of learning disability. With reading and language processing skewed towards left hemisphere functioning, selective blockage of the left visual field may produce more effective processing of visual symbol decoding in reading.

Use as a diagnostic tool in the neurology setting. Patients with intractable epilepsy often undergo a specialized invasive procedure known as the Wada procedure. In this procedure, sodium amytol is injected in the internal carotid artery of the patient, effectively putting one hemisphere "to sleep" for several minutes, while the other hemisphere remains functionally normal. The neurologist and neuropsychologist can then perform a series of cognitive tests to evaluate the integrity of functioning of the intact hemisphere in an effort to isolate the focus of the seizure disorder. This technique is often unpredictable, and because the anesthesia is short-lived the quantity of data available for collection is limited. With occluded lenses, the neurologist and neuropsychologist can evaluate similar isolation of hemispheric performance without the time constraints and confounds produced by drug induced mental status changes.

Occluded lenses could also be used in the diagnosis of epilepsy as a useful addition to the standard electroencephalogram (EEG) procedure. This noninvasive neurodiagnostic procedure utilizing external electrodes placed about the skull architecture to sense and record brain electrical activity typically requires that the patient submit to photic stimulation with rhythmic strobe light exposure. Occluded lenses could be used to further isolate brain electrical activity in each hemisphere by selectively blocking visual input. In the evoked potential variant of the EEG, where brain activity is recorded in response to specific stimulation, the use of occluded lenses again could further articulate the functioning of an exposed hemisphere, as well as brain activity across the corpus callosum and into the hemisphere that has sensory block.

Use in functional assessment of cognitive skills. Neuropsychologists can use occluded lenses to functionally assess hemispheric functioning by selectively presenting information that either coincides or interferes with the unblocked visual field. These procedures can help clarify the role of each hemisphere in acquisition of information and interference with acquisition.

Performance enhancement training. Occluded lenses could also be effective in visual training in non-medical settings. For example, baseball batters use asymmetric visual information when standing at the plate judging pitches. The use of occluded lenses to isolate the field that captures the pitcher and pitch, and block the catcher, umpire, and other distractions might significantly improve batting performance. Golfers might also benefit from the use of occluded lenses to limit interference from visual distractions that occur behind the vector line beginning with the ball tee. Tennis players might utilize occluded lenses to aid in visual tracking and concentration during backhand practice.

Use as a research tool. In addition to left hemispheric specialization related to reading and language, spatial, arithmetic and social/emotional sensibilities are skewed towards right hemisphere processing. The use of occluded lenses to effectively block and isolate specific areas of brain functioning might be effective as generating useful information and greater understanding of the brain's functioning.

The present invention has been described with reference to certain preferred and alternative embodiments that are intended to be exemplary only and not limiting to the full scope of the present invention as set forth in the appended claims.

What is claimed is:

1. A contact lens for training and rehabilitation of a targeted hemisphere of the brain of a person by placing the contact lens on an eye of the person so that visual sensory input through the pupil of the eye of the person is substantially reduced to a non-targeted hemisphere of the brain of the person and substantially forced to the targeted hemisphere, comprising:

a first region of the contact lens comprising a substantially transparent material over a first portion of the pupil so that a significant degree of visual sensory input is allowed to reach the targeted hemisphere;

a second region of the contact lens comprising a substantially opaque material over a second portion of the pupil so that visual sensory input is substantially reduced to the non-targeted hemisphere;

a third region of the contact lens comprising a substantially transparent material over at least a portion of the lateral area of the pupil corresponding to the non-targeted hemisphere whereby visual sensory input to the peripheral visual field of the person allows the maintenance of orientation and balance; and means for preventing rotation of the contact lens on the eye of the person.

2. The contact lens of claim 1 wherein said second region is defined by a first line between said first region and said second region and by a second line between said second region and said third region.

3. The contact lens of claim 2 wherein said first line is substantially a straight line.

4. The contact lens of claim 2 wherein said second line is substantially a straight line.

5. The contact lens of claim 3 wherein said first line is substantially vertical when the contact lens is placed on the eye of the person.

6. The contact lens of claim 4 wherein said second line is substantially vertical when the contact lens is placed on the eye of the person.

7. A contact lens for training and rehabilitation of a targeted hemisphere of the brain of a person by placing the contact lens on an eye of the person so that visual sensory input through the pupil of the eye of the person is substantially reduced to a non-targeted hemisphere of the brain of the person and substantially forced to the targeted hemisphere, comprising:

a first region of the contact lens comprising a substantially transparent material over a first portion of the pupil so that a significant degree of visual sensory input is allowed to reach the targeted hemisphere;

a second region of the contact lens comprising a substantially opaque material over a second portion of the pupil so that visual sensory input is substantially reduced to the non-targeted hemisphere;

a third region of the contact lens comprising a substantially transparent material over at least a portion of the lateral area of the pupil corresponding to the non-targeted hemisphere whereby visual sensory input to the peripheral visual field of the person allows the maintenance of orientation and balance; and means for preventing rotation of the contact lens on the eye of the person; wherein said second region is defined by a first line between said first region and said second region and by a second line between said second region and said third region;

each of said first and second lines is substantially a straight line; and each of said first and second lines on the contact lens is placed on the eye of the person whereby said second region comprises a substantially vertical occluded strip across the contact lens.

* * * * *